(12) United States Patent
Garza et al.

(10) Patent No.: US 10,304,014 B2
(45) Date of Patent: May 28, 2019

(54) PROACTIVE RESOURCE ALLOCATION PLAN GENERATOR FOR IMPROVING PRODUCT RELEASES

(71) Applicant: International Business Machines Corporation, Armonk, NY (US)

(72) Inventors: Alberto Garza, Austin, TX (US); Emile L. Kowalski, Austin, TX (US); Rodolfo Lopez, Austin, TX (US); Julio A. Maldonado, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/644,315

(22) Filed: Jul. 7, 2017

(65) Prior Publication Data

US 2019/0012149 A1    Jan. 10, 2019

(51) Int. Cl.
| | | |
|---|---|---|
| *G06F 9/44* | (2018.01) | |
| *G06Q 10/06* | (2012.01) | |
| *G06F 8/20* | (2018.01) | |
| *G06N 99/00* | (2019.01) | |
| *G06F 8/36* | (2018.01) | |
| *G10L 15/26* | (2006.01) | |
| *G06F 17/21* | (2006.01) | |
| *G06N 20/00* | (2019.01) | |

(52) U.S. Cl.
CPC .............. *G06Q 10/06* (2013.01); *G06F 8/20* (2013.01); *G06F 8/36* (2013.01); *G06F 17/211* (2013.01); *G06N 20/00* (2019.01); *G06N 99/005* (2013.01); *G06Q 10/06313* (2013.01); *G10L 15/265* (2013.01)

(58) Field of Classification Search
CPC .. G06Q 10/06; G06Q 10/04; G06Q 10/06311; G06Q 30/02; G06F 9/5011; G06F 8/71; G06F 8/20; G06F 17/5004; H04L 67/1097
See application file for complete search history.

(56) References Cited

U.S. PATENT DOCUMENTS

| | | | | |
|---|---|---|---|---|
| 2003/0097296 | A1* | 5/2003 | Putt ........................ | G06Q 10/06 705/7.23 |
| 2008/0255910 | A1 | 10/2008 | Bagchi et al. | |
| 2008/0313595 | A1* | 12/2008 | Boulineau ................. | G06F 8/20 717/101 |

(Continued)

*Primary Examiner* — Tuan A Vu
(74) *Attorney, Agent, or Firm* — Patterson + Sheridan, LLP

(57) ABSTRACT

Systems, methods, and computer program products to perform an operation comprising identifying a plurality of data sources, receiving input specifying one or more of the plurality of data sources and a set of parameters, wherein the set of parameters comprise at least a product and a due date for the product, generating, based on a machine learning (ML) model and data received from each of the specified one or more data sources, a resource allocation plan for a product specified in the input, wherein the resource allocation plan specifies at to allocate at least one resource to the product, wherein the at least one resource comprises one or more of hardware resources and software resources, and responsive to receiving input accepting the generated resource allocation plan, allocating the at least one resource in the resource allocation plan to develop the product.

20 Claims, 7 Drawing Sheets

(56) References Cited

U.S. PATENT DOCUMENTS

| | | | |
|---|---|---|---|
| 2011/0112882 A1* | 5/2011 | Summers | G06Q 10/04 |
| | | | 705/7.23 |
| 2012/0023476 A1* | 1/2012 | Bugayenko | G06F 8/71 |
| | | | 717/103 |
| 2012/0110087 A1* | 5/2012 | Culver | G06F 17/5004 |
| | | | 709/205 |
| 2015/0130761 A1* | 5/2015 | Hong | G06F 9/5011 |
| | | | 345/174 |
| 2016/0110662 A1 | 4/2016 | Dispoto et al. | |
| 2016/0162478 A1* | 6/2016 | Blassin | G06Q 10/06311 |
| | | | 706/12 |
| 2016/0307134 A1 | 10/2016 | Cantor et al. | |
| 2016/0342928 A1 | 11/2016 | Godwin | |
| 2017/0134304 A1* | 5/2017 | Lin | H04L 67/1097 |
| 2018/0143858 A1* | 5/2018 | Sanjabi | G06F 9/5011 |
| 2018/0158159 A1* | 6/2018 | Divine | G06Q 30/02 |

\* cited by examiner

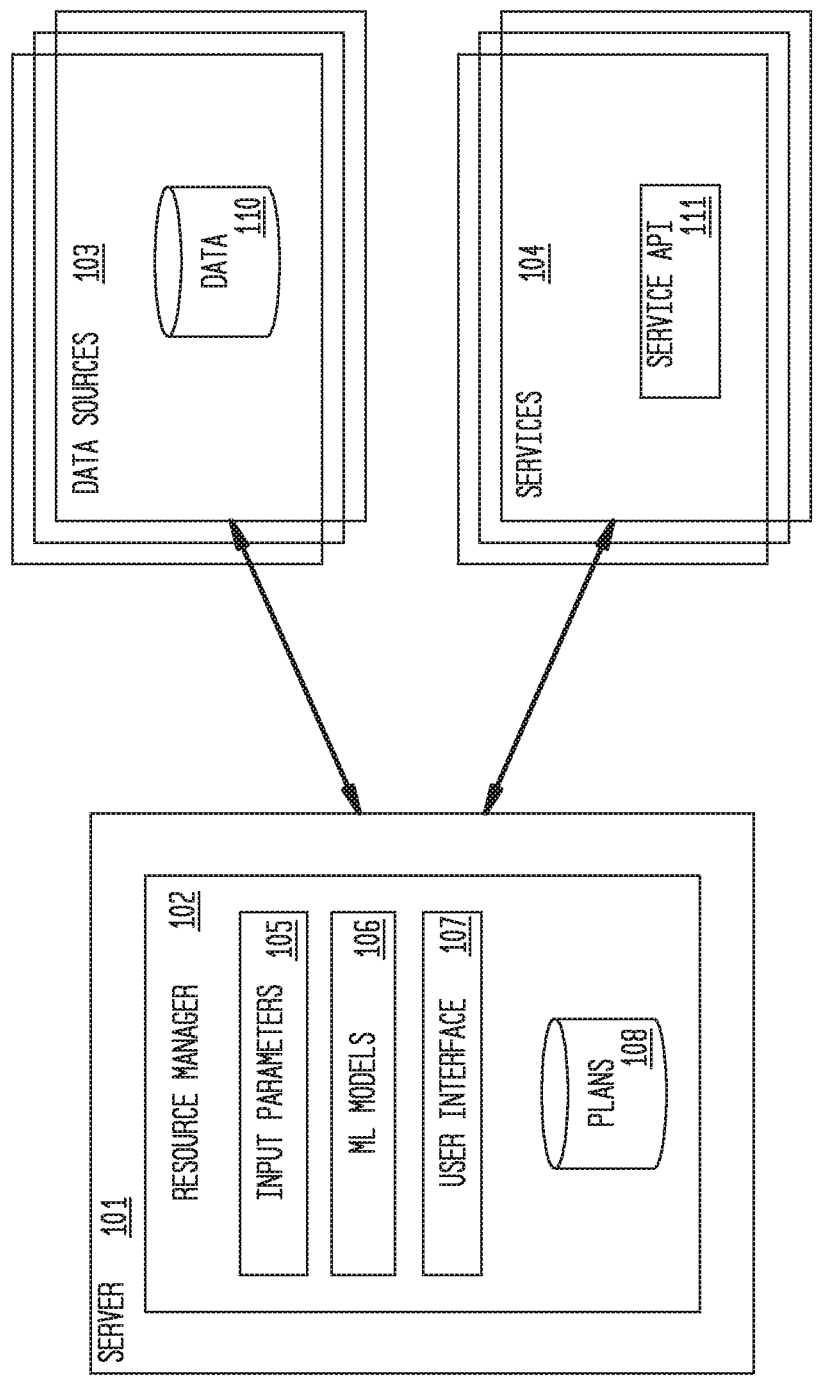

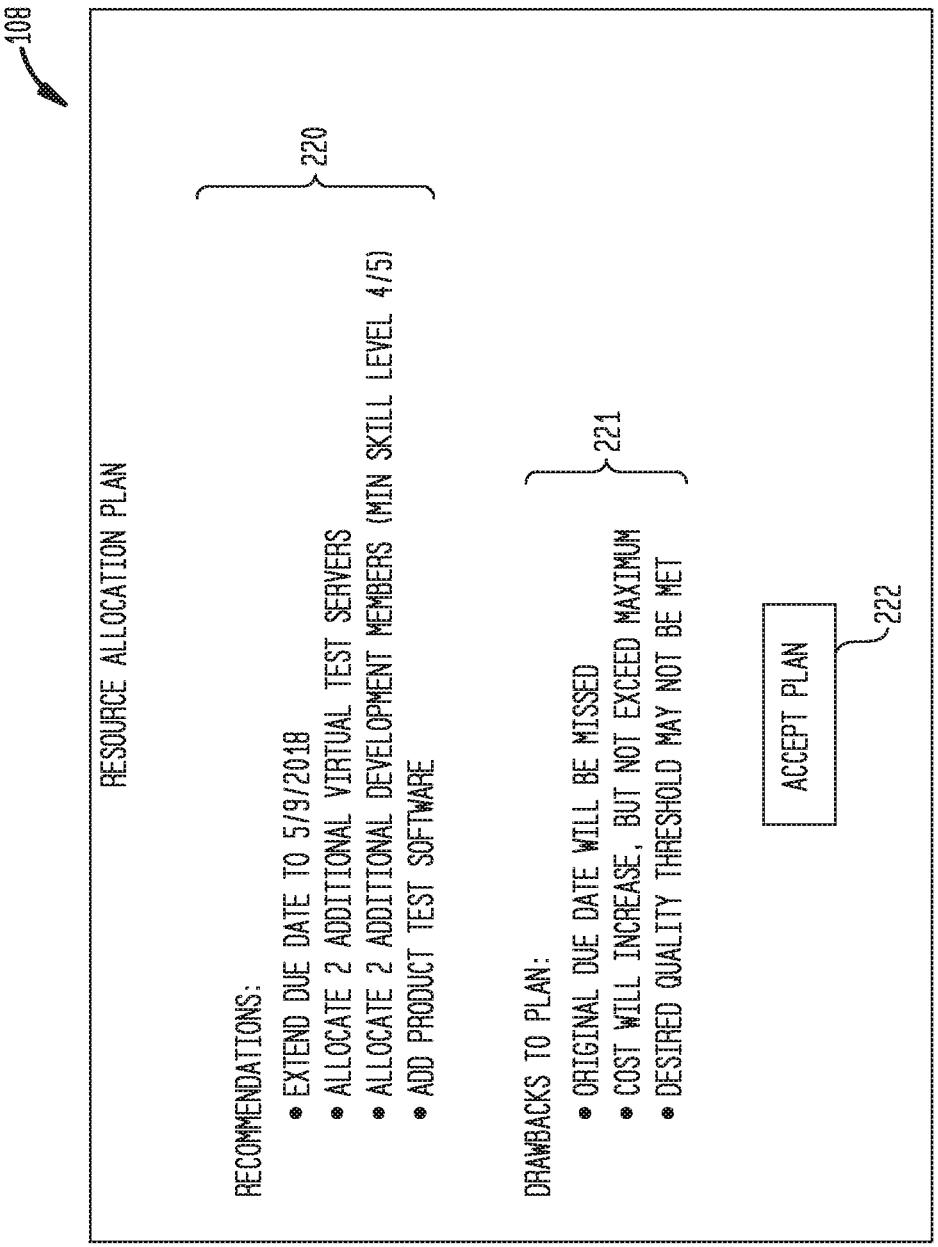

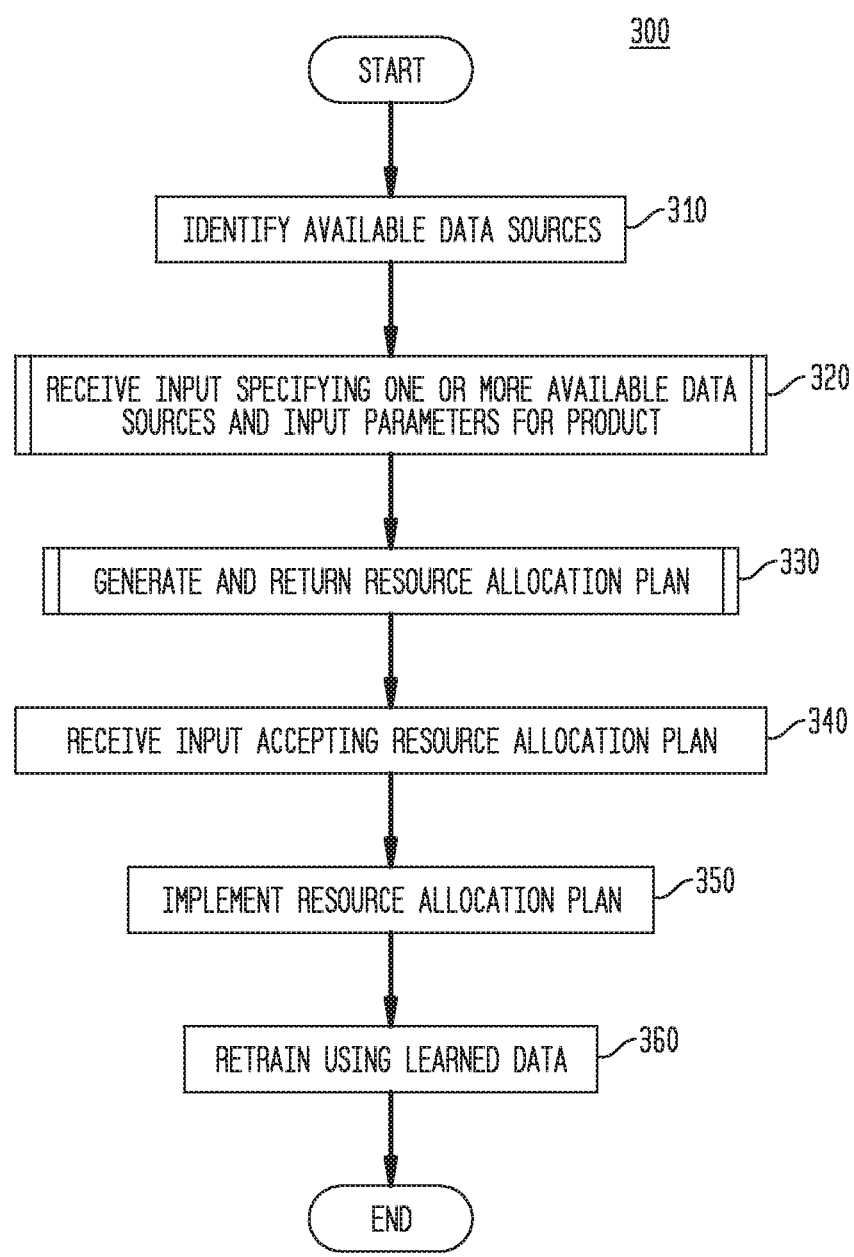

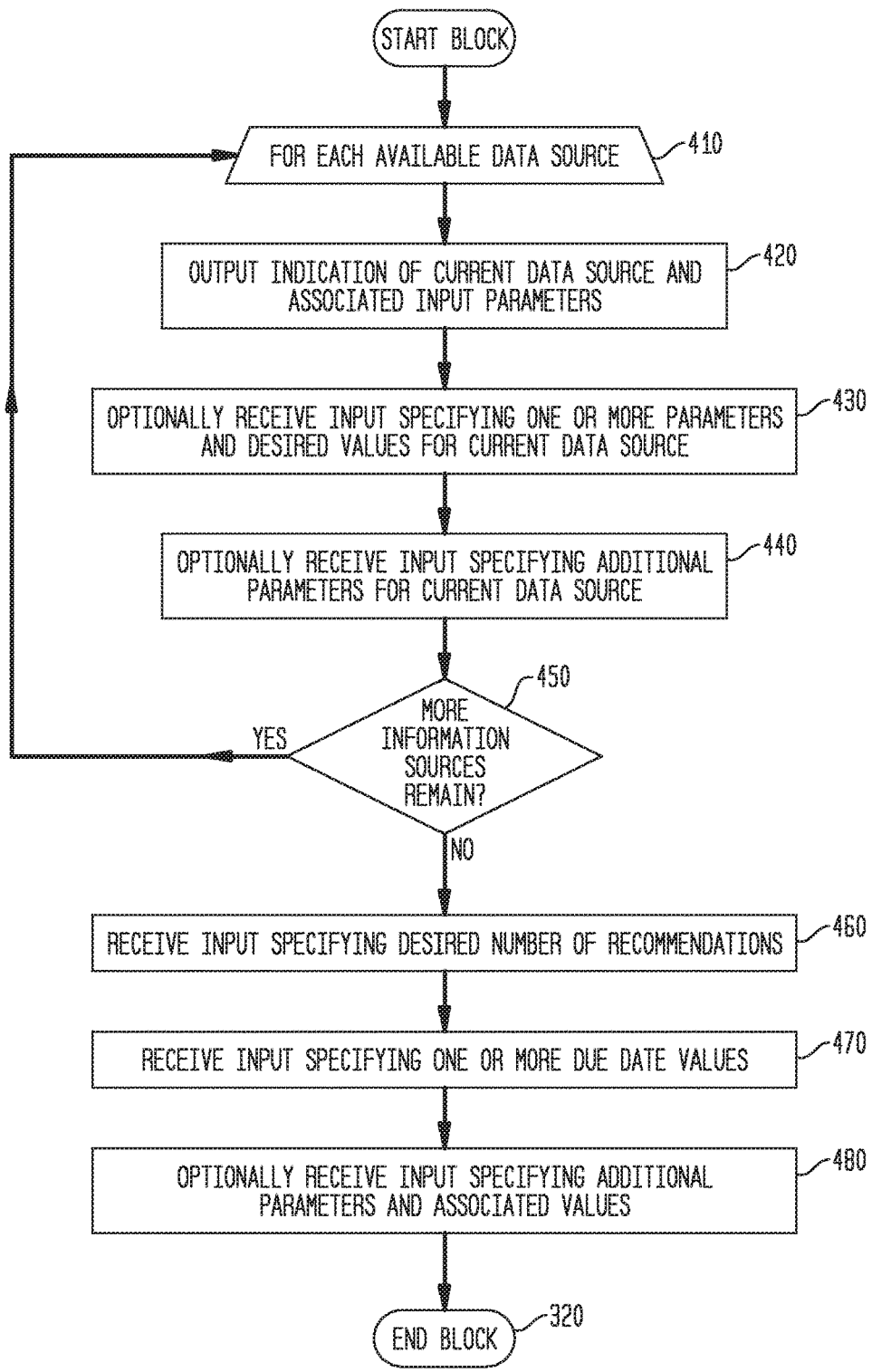

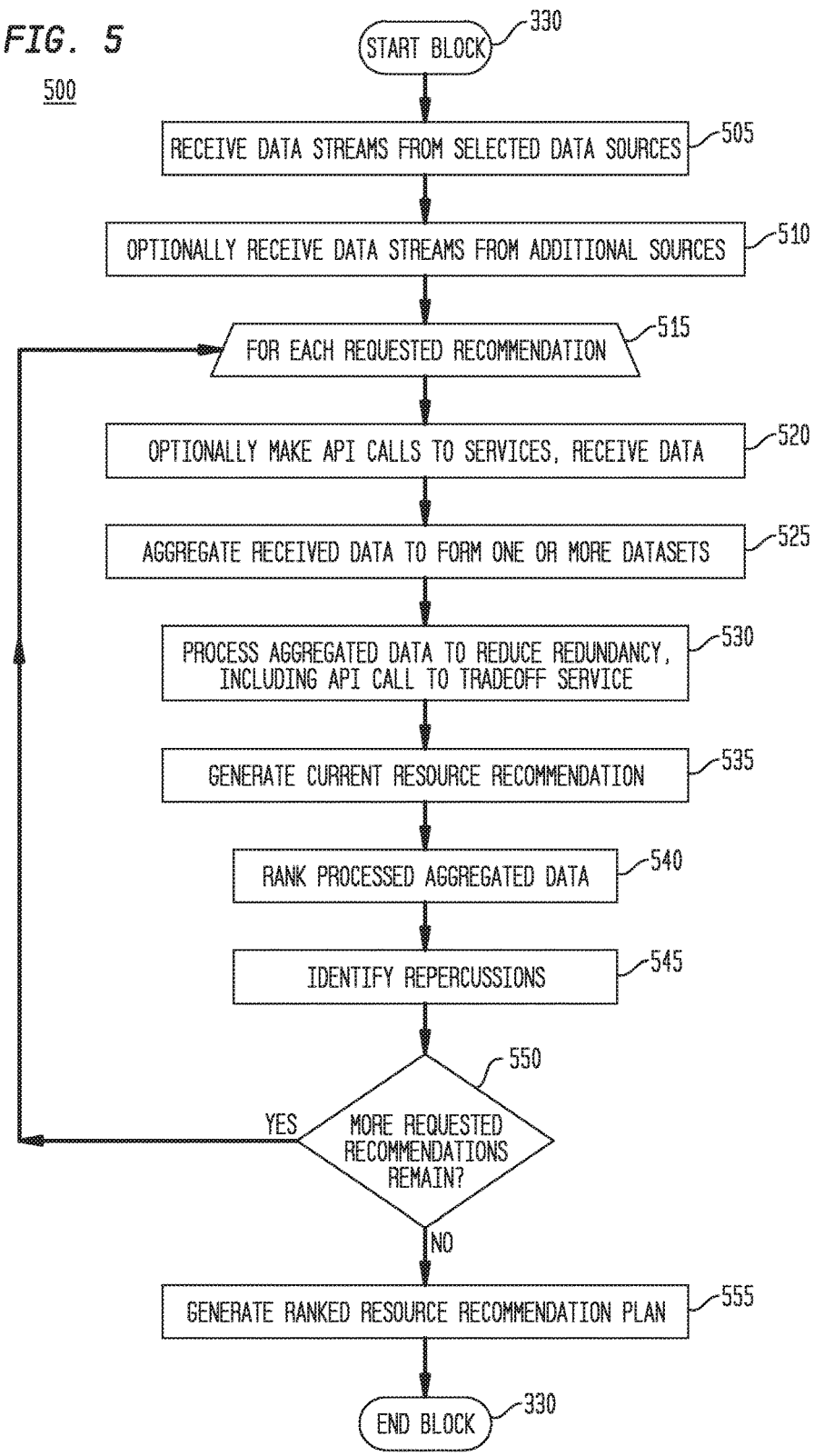

PROACTIVE RESOURCE ALLOCATION PLAN GENERATOR FOR IMPROVING PRODUCT RELEASES

BACKGROUND

The present disclosure relates to computer software, and more specifically, to computer software which generates proactive resource allocation plans for improving product releases.

Product releases require significant planning to ensure that adequate resources (e.g., hardware, software, and staff) are allocated to the project. In doing so, many factors that contribute to the timely delivery of a quality product must be considered. Often, cost considerations, fluctuation in product content, limited budgets, and staffing concerns impact the decisions made when determining allocating resources. Conventionally, however these n considerations have not been adequately represented, measured, and understood. As such, deadlines are missed, cost overruns are incurred, and product quality can be sacrificed.

SUMMARY

According to one embodiment of the present disclosure, a method comprises identifying a plurality of data sources, receiving input specifying one or more of the plurality of data sources and a set of parameters, wherein the set of parameters comprise at least a product and a due date for the product, generating, based on a machine learning (ML) model and data received from each of the specified one or more data sources, a resource allocation plan for a product specified in the input, wherein the resource allocation plan specifies at to allocate at least one resource to the product, wherein the at least one resource comprises one or more of hardware resources and software resources, and responsive to receiving input accepting the generated resource allocation plan, allocating the at least one resource in the resource allocation plan to develop the product.

According to another embodiment, a system comprises one or more processors and a memory containing a program which when executed by the processors performs an operation comprising identifying a plurality of data sources, receiving input specifying one or more of the plurality of data sources and a set of parameters, wherein the set of parameters comprise at least a product and a due date for the product, generating, based on a machine learning (ML) model and data received from each of the specified one or more data sources, a resource allocation plan for a product specified in the input, wherein the resource allocation plan specifies at to allocate at least one resource to the product, wherein the at least one resource comprises one or more of hardware resources and software resources, and responsive to receiving input accepting the generated resource allocation plan, allocating the at least one resource in the resource allocation plan to develop the product.

According to another embodiment, a computer program product comprises a non-transitory computer-readable storage medium having computer-readable program code embodied therewith, the computer-readable program code executable by one or more computer processors to perform an operation comprising identifying a plurality of data sources, receiving input specifying one or more of the plurality of data sources and a set of parameters, wherein the set of parameters comprise at least a product and a due date for the product, generating, based on a machine learning (ML) model and data received from each of the specified one or more data sources, a resource allocation plan for a product specified in the input, wherein the resource allocation plan specifies at to allocate at least one resource to the product, wherein the at least one resource comprises one or more of hardware resources and software resources, and responsive to receiving input accepting the generated resource allocation plan, allocating the at least one resource in the resource allocation plan to develop the product.

BRIEF DESCRIPTION OF THE SEVERAL VIEWS OF THE DRAWINGS

FIG. 1 is a block diagram illustrating components of a system which generates proactive resource allocation plans for improving product releases, according to one embodiment.

FIGS. 2A-2B illustrate graphical user interfaces for generating proactive resource allocation plans for improving product releases, according to various embodiments.

FIG. 3 is a flow chart illustrating a method to generate proactive resource allocation plans for improving product releases, according to one embodiment.

FIG. 4 is a flow chart illustrating a method for receiving input specifying one or more available data sources, associated parameters, and/or optional parameters, according to one embodiment.

FIG. 5 is a flow chart illustrating a method for generating and returning resource allocation plans, according to one embodiment.

DETAILED DESCRIPTION

Figure 2A:
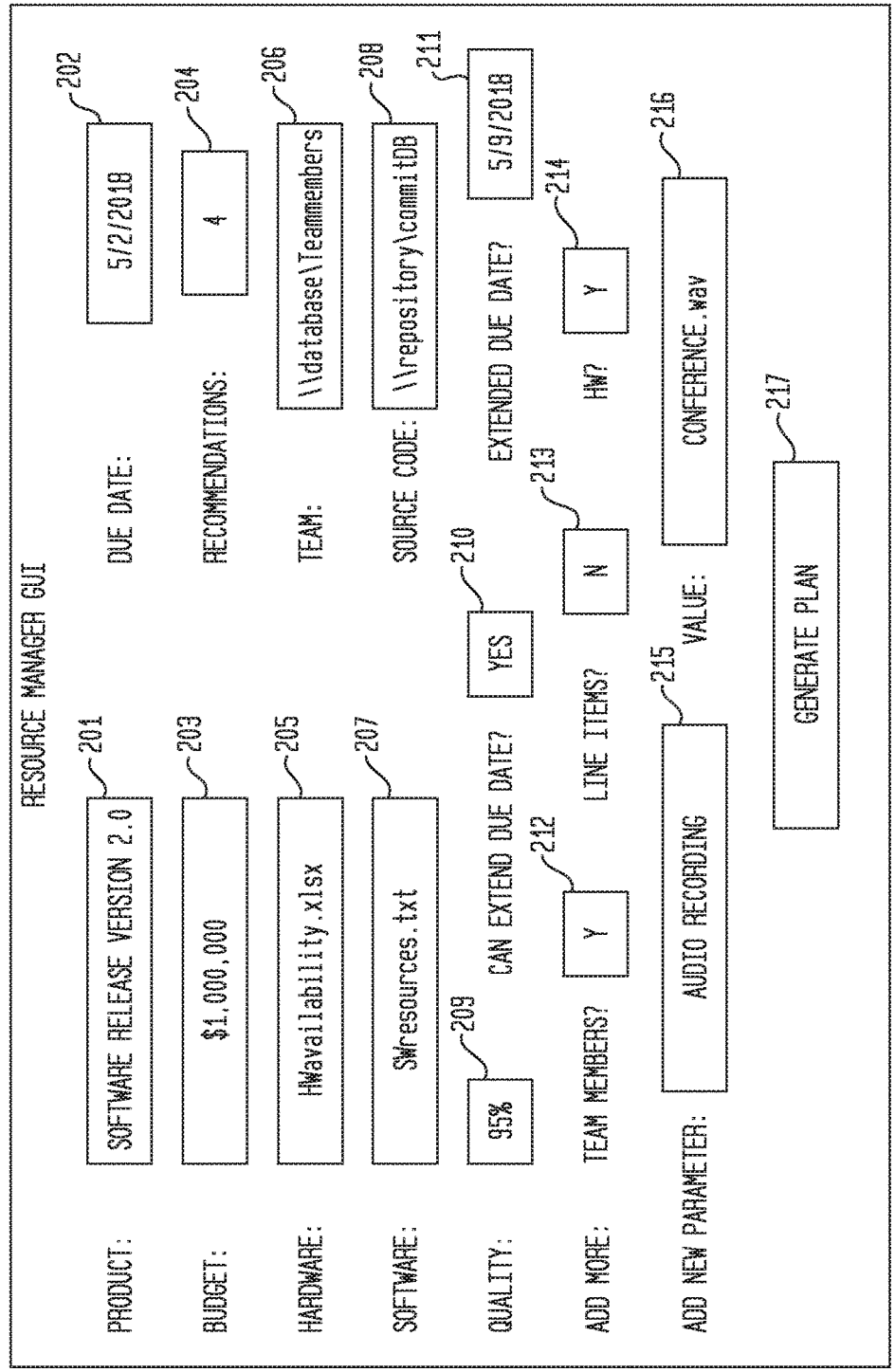

Embodiments disclosed herein provide automated techniques to improve one or more stages of product development. More specifically, embodiments disclosed herein leverage different data sources, cognitive computing, and analytics to dynamically determine the resources needed to meet product delivery deadlines. The needed resources may be determined as part of a resource allocation plan, which is generated and returned to a user along with any determined drawbacks or repercussions of the resource allocation plan. Furthermore, embodiments disclosed herein can dynamically update the resource allocation plan as inputs change, forecasting different outcomes and learning based on aggregated data sources. When a product stage has completed and/or a product is ultimately released, embodiments disclosed herein leverage the data associated with the product to improve the subsequent generation of resource allocation plans.

FIG. 1 is a block diagram illustrating components of a system 100 which generates proactive resource allocation plans for improving product releases, according to one embodiment. As shown, the system 100 includes a server 101 hosting a resource manager 102, a plurality of data sources 103, and a plurality of services 104. The resource manager 102 is a cognitive system configured to generate resource allocation plans for product releases. The data sources 103 are representative of any type of local and/or remote data source. The data 110 may include any type of data, such as source code repositories, structured information sources, voice recordings, machine learning data, documents, files, and the like. The services 104 may be any type of service, such as a speech-to-text conversion service, document conversion services, ranking services, and the like. The service application programming interface (API) 111 facilitates communication between the resource manager 102 and a given service.

As shown, the resource manager 102 includes a set of input parameters 105, one or more machine learning (ML) models 106, one or more user interfaces 107 for receiving user input, and a data store of resource allocation plans 108. Generally, the resource manager 102 generates one or more resource allocation plans 108 based on input parameters 105, ML models 106, data 110 received from one or more data sources 103, and the services 104. The resource allocation plans 108 include descriptions of the resources needed to satisfy a deadline for the product release (and/or one or more stages of a product release). The resource allocation plans 108 further other metadata, such as whether a given resource allocation plan 108 would allow due dates, budgets, and quality standards to be met. The resources may include hardware resources, software resources, human resources, and any other type of resource. The product may be any type of product, such as hardware and/or software, tangible products, and the like.

The resource manager 102 may be initially trained on training data (not pictured). The training data includes labeled input that allows the resource manager 102 to compute a desired outcome. For example, the training data may include a set of input parameters related to an example software product release, and a desired amount of hardware resources (e.g., servers, processors, memory, network bandwidth, etc.), software resources (e.g., operating systems, development tools, testing tools, etc.), and human resources. The training data may further specify whether a given resource allocation for a project would allow due dates, budgets, quality standards, etc., to be met. The resource manager 102 uses the training data to generate one or more resource allocation plans 108 in accordance with the desired outcomes specified in the training data. As part of the training process, the resource manager 102 may generate one or more ML models 106 that specify features and associated weights for generating subsequent resource allocation plans 108. For example, during training, the resource manager 102 may determine that adding software tools and appropriate numbers of staff are correlated with meeting due dates for software releases. In such an example, the ML models 106 would specify greater weights to adding software tools and staff to software release projects. The resource manager 102 may then apply these weights in generating subsequent resource allocation plans 108 for software release projects.

Once trained, the resource manager 102 may receive user requests to generate one or more resource allocation plans 108 for a given product. The user request may specify one or more input parameters 105, which may include user-defined and/or default parameters. For example, the input parameters 105 may include an indication of the subject product, one or more due dates (e.g., product release dates/schedules), desired data sources 103 and/or data 110, desired services 104, budget line items, available hardware and/or software resources, available employee resources, user preference parameters (e.g., whether to extend a due date, whether to raise quality standards, etc.), and a requested number of resource allocation recommendations in the resource allocation plan 108.

To generate the requested resource allocation plan(s) 108, the resource manager 102 receives the data 110 from the specified data sources 103, standardizes the received data, and generates recommendations for the product release. The recommendations include example resource allocations, as well as natural language statements which predict the outcome of implementing the associated resource allocations. For example, the generated resource allocation plan 108 may include a resource recommendation to add 5 employees and a software testing suite, and indicate that implementing the resource recommendation would result in failing to meet a due date for the product release, but maintain quality above a predefined quality threshold.

FIG. 2A illustrates an example graphical user interface (GUI) 107 for generating proactive resource allocation plans for improving product releases, according to one embodiment. Although depicted as a GUI 107, the resource manager 102 may receive user input via any number and type of interfaces 107. For example, the interfaces 107 include interfaces that allow the user to enter command line input, provide voice input, and the like. As shown, the GUI 107 includes example input elements 201-216 for receiving user input for generating resource allocation plans 108. The input element 201 reflects a name of a product, in this example, version 2.0 of a software release, while input element 202 reflects a due date of May 2, 2018 for the software release. Input element 203 allows the user to specify a monetary budget for the product, while input element 204 allows the user to specify a number of resource allocation recommendations for the resource allocation plan 108 to be generated by the resource manager 102 (in this example, 4 resource allocation recommendations).

As previously indicated, the user input 105 may include data sources 103 and corresponding data 110. As shown, input element 205 corresponds to a file which reflects available hardware, which may include a calendar of availability for each item of hardware (e.g. servers, compute cores, etc.). Input element 206 allows the user to specify a database storing employee information. The database may include, for each employee, a plurality of skill levels of the employee (e.g., for a plurality of different tasks, subjects, etc.), efficiency levels, quality levels, employee availability calendars, and any other type of metadata. Input element 207 corresponds to available software, and allows the user to enter a file (or other data type) specifying the types and availability of different software packages for the product release. Input element 208 corresponds to a source code repository, and allows the user to specify where the source code for version 2.0 of the software release is located. Doing so allows the resource manager 102 to analyze the progress of the source code (e.g., by comparing the number of commits in the repository to the expected number of commits for the final release of the software).

Input element 209 corresponds to a quality threshold specified by the user. Ion one embodiment, the resource manager 102 determines quality relative to the amount of time remaining until the due date and an estimated amount of time to complete the project (e.g., based on the skill of each worker assigned to the project, the efficiency of each worker assigned to the project, etc.). Input element 210 allows the user to specify whether to permit extension of the due date 202, while input element 211 allows the user to specify an optional extended due date. Input elements 212-214 allow the user to specify whether to permit the allocation of additional employees, line items, and hardware resources, respectively, in the generated resource allocation plan 108.

Advantageously, embodiments disclosed herein support any type of input parameter, including user-defined parameters. While the resource manager 102 may generate the GUI 107 based on the available data sources 103, the user may define additional parameters. As shown, the user has defined an audio recording input parameter in input field 215, and specified a filename of an audio recording in input field 216. Doing so allows the resource manager 102 to extract relevant information from the audio recording when generating a resource allocation plan. For example, if the audio recording included a person stating that they were taking a leave of absence and would not be available to work on the software release, the resource manager 102 may generate a resource allocation plan 108 accordingly (e.g., adding new employees to the project, adding additional software resources, extending the due date, etc.). The input element 217 allows the user to submit the request to the resource manager 102, which then generates the requested resource allocation plan 108.

FIG. 2B is a GUI depicting an example resource allocation plan 108 generated by the resource manager 102, according to one embodiment. As shown, the resource allocation plan 108 includes a plurality of recommendations 220 and a set of drawbacks 221. As shown, the resource allocation plan 108 includes 4 recommendations (based on the value provided in input element 204 of FIG. 2A), which include extending the due date of the software release, allocating 2 additional virtual test servers, allocating 2 additional software developers with a minimum skill level of 4 out of 5, and adding a product test suite to the software project. The drawbacks 221 specify that the original due date will be missed, that the cost of the project will increase, but not exceed the budget, and that the desired quality threshold may not be met if the plan is accepted. The user may accept the plan 108 via the input element 222. In response, the resource manager 102 may implement the plan 108 by reserving and/or configuring the recommended hardware and/or software resources, modifying the due date, notifying added development members, and the like. Furthermore, the resource manager 102 may re-train itself using the generated plan 108 and any data associated with the plan (e.g., whether the product was released prior to the relevant due date, whether project milestones were completed prior to the relevant due dates, whether quality standards were met, etc.).

FIG. 3 is a flow chart illustrating a method 300 to generate proactive resource allocation plans for improving product releases, according to one embodiment. As shown, the method 300 begins at block 310, where the resource manager 102 identifies available data sources 103. For example, the resource manager 102 may be configured with a list of predefined data sources 103 for a given deployment of the resource manager 102. The resource manager 102 may then attempt to establish a connection to each predefined data source 103. As previously indicated, any type of data source 103 can be used, and the corresponding data 110 of each data source may be of any format. For example, the data sources may include code repositories, databases, user profiles, audio recordings, emails, text messages, and data learned by the resource manager 102 and stored for future use (e.g., in the ML models 106). At block 320, described in greater detail with reference to FIG. 4, the resource manager 102 receives input specifying one or more of the identified data sources and one or more input parameters 105 as part of a request to generate a resource allocation plan for a product. Generally, the user specifies a product being developed, at least one due date for the product, and one or more parameters for generating a resource allocation plan 108, such as a number of desired recommendations for the resource allocation plan 108, whether due dates can be extended, and the like.

At block 330, described in greater detail with reference to FIG. 5, the resource manager 102 generates and returns the requested resource allocation plan 108. Generally, the resource manager 102 receives data 110 from each data source 103 specified as input parameters 105, analyzes the received data, and generates the resource allocation plan 108 based on the analyzed data, the input parameters 105, the ML models 106, and the services 104. At block 340, the resource manager 102 receives user input specifying to accept the resource allocation plan 108 generated at block 330. At block 350, the resource manager 102 implements the accepted resource allocation plan 108. As previously stated, in implementing the resource allocation plan 108, the resource manager 102 may allocate and reserve hardware and/or software resources, modify due dates, and the like. At block 360, the resource manager 102 is retrained using learned data, namely any data analyzed and/or generated while generating the resource allocation plan 108, and any data created during the product development (e.g., whether due dates, quality standards, etc., were met). Doing so updates the ML models 106, which improves the subsequent resource allocation plans 108 generated by the resource manager 102.

FIG. 4 is a flow chart illustrating a method 400 corresponding to block 320 for receiving input specifying one or more available data sources, associated parameters, and/or optional parameters, according to one embodiment. As shown, the method 400 begins at block 410, where the resource manager 102 executes a loop including blocks 420-440 for each available data source 103 identified at block 310. At block 420, the resource manager 102 outputs an indication of the current data source 103 and any associated input parameters for the data 110 of the current data source 103, e.g., in the GUI 107. For example, the current data source 103 may be an employee database, and the input parameters may include employee availability, employee skills and/or associated skill levels, and the like. At block 430, the resource manager 102 optionally receives input specifying one or more of the parameters and any associated values for the current data source via the GUI 107. For example, the user may specify to add some number of employees meeting a desired skill level in some skill. At block 440, the resource manager 102 optionally receives input specifying additional parameters for the current data source 103. For example, the user may define new parameters for the employee database, such as the productivity level of an employee. At block 450, the resource manager 102 determines whether any more data sources 103 remain. If more data sources 103 remain, the resource manager 102 returns to block 410. If no more data sources 103 remain, the resource manager 102 proceeds to block 460.

At block 460, the resource manager 102 receives user input specifying a desired number of recommendations for the resource allocation plan 108. For example, the user may specify to generate 10 resource allocation recommendations. At block 470, the resource manager 102 receives input specifying one or more due date values for the product (e.g., a final release date, milestone dates during the project, etc.). At block 480, the resource manager 102 optionally receives input specifying user-defined parameters and associated values for the user-defined parameters. Generally, the user may define any type of input parameter 105. Similarly, the input parameters 105 of the data sources 103 may be of any type. Example types of input parameters 105 include, but are not limited to product deliverables (e.g., line items, product specifications, etc.), one or more due dates, a number of available employees in the organization, an experience level (of a range of experience levels) of each employee, the work schedule of an employee (e.g., estimated number of hours of availability), the other projects the employee is working on, and employee vacation schedules. The types of input parameters 105 may further include a count of line items per employee (e.g., an estimated number of deliverable tasks the employee will be able to complete in different scenarios, such as best case, average case, and worst case scenarios). The types of input parameters 105 may further include indications of available enterprise resources, such as hardware, software, and the availability thereof. The types of input parameters 105 may further include caveats or other concerns that may cause a delay in a product deliverable.

FIG. 5 is a flow chart illustrating a method 500 corresponding to block 330 for generating and returning resource allocation plans, according to one embodiment. As shown, the method 500 begins at block 505, where the resource manager 102 receives data streams (e.g., data 110) from each data source 103 selected as an input parameter 105 by the user, such as code repositories, databases, etc. At block 510, the resource manager 102 optionally receives data streams from additional data sources, such as Internet data sources, audio data, confidential information, conversation transcripts, etc. At block 515, the resource manager 102 executes a loop including blocks 520-545 for each recommendation requested by the user for inclusion in the resource allocation plan 108.

At block 520, the resource manager 102 optionally makes API calls to the service APIs 111 of one or more services 104. For example, if the data received at blocks 505, 510 include audio data, the resource manager 102 may make an API call to the service API 111 of a speech to text transcription service 104. In such an example, the resource manager 102 may provide the audio data to the speech to text transcription service 104, which may return a text transcription of any speech in the audio data. As another example, if the data received at blocks 505, 510 include documents of different formats, the resource manager 102 may make an API call to the service API 111 of a document conversion service 104. In such an example, the resource manager 102 may provide a plurality of documents to the document conversion service 104. The plurality of documents may be formatted according to a variety of different formats. The document conversion service 104 may then convert the received documents to a standardized format (e.g., XML, JSON, etc.).

At block 525, the resource manager 102 aggregates the data received at blocks 505, 510, and 520. In aggregating the data, the resource manager 102 converts raw data to a dataset. At block 530, the resource manager 102 processes the aggregated data to eliminate redundancy. Furthermore, the resource manager 102 identifies any key-value correlations in the aggregated data. For example, the resource manager 102 may make an API call to the service API 111 of a tradeoff analytics service 104. The tradeoff analytics service 105 uses mathematical filtering (e.g., "pareto optimization"), which enables exploring tradeoffs when considering multiple criteria for a decision. At block 535, the resource manager 102 generates one or more recommendations. At block 540, the resource manager 102 ranks the processed, aggregated data to identify a recommendation and an associated repercussion (if any). In one embodiment, the resource manager 102 makes an API call to the service API 111 of a ranking service 104, which computes a score for each of a plurality of different possible recommendations generated by the resource manager 102. The n-highest ranking recommendations (where n is equal to the number of requested recommendations) may ultimately be returned to the user as part of the resource allocation plan 108. At block 545, the resource manager 102 identifies any repercussions based on the ranking service 104. Generally, the resource manager 102 uses the ML models 106 to determine what impact the corresponding recommendation might have on the project (e.g., adding more team members may cause a due date to be missed).

At block 550, the resource manager 102 determines whether more requested recommendations remain. If more requested recommendations remain, the resource manager 102 returns to block 515. If no more requested recommendations remain, the resource manager 102 generates a ranked resource recommendation plan 108 including the requested number of recommendations and one or more repercussions associated with the resource recommendation plan 108.

Figure 6:
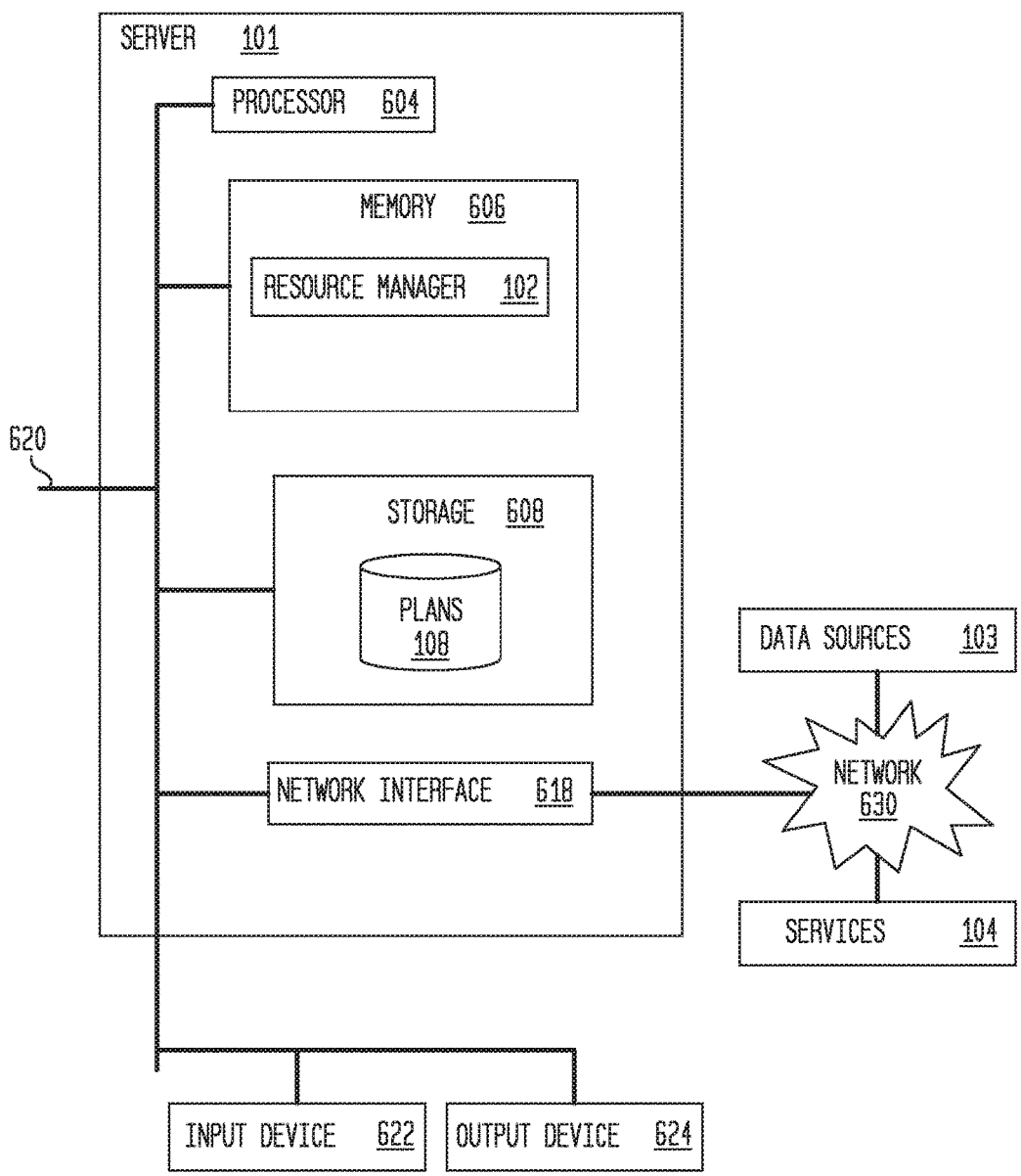
FIG. 6 illustrates a system which generates proactive resource allocation plans for improving product releases, according to one embodiment.

FIG. 6 illustrates a system 600 which generates proactive resource allocation plans for improving product releases, according to one embodiment. The networked system 600 includes a computer 602. The computer 602 may also be connected to other computers (e.g., the data sources 103 and the services 104) via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on. As shown, the memory 606 contains the resource manager 102, while the storage 608 includes the resource allocation plans 108.

Generally, the system 600 is configured to implement all systems, methods, and apparatuses described above with reference to FIGS. 1-5.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the resource manager 102 could execute on a computing system in the cloud and generate resource allocation plans. In such a case, the resource manager 102 could store the generated resource allocation plans at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying, by a resource management component executing by operation of one or more computer processors, a plurality of data sources;
   receiving, by the resource management component, from a user, at a first point in time, input specifying one or more of the plurality of data sources and a set of parameters;
   retrieving, by the resource management component, a code repository for an ongoing project, based on the input specifying one or more of the plurality of data sources;
   retrieving, by the resource management component, a calendar of future availability of one or more hardware resources, based on the input specifying one or more of the plurality of data sources;
   retrieving, by the resource management component, employee information, wherein the employee information includes an efficiency of each employee and a set of skills possessed by each employee, based on the input specifying one or more of the plurality of data sources;
   determining, by the resource management component, based on the input specifying the set of parameters, an ongoing project, a current due date for the ongoing project, a required level of quality for the ongoing project, a budget for the ongoing project, an indication that additional employees can be added to the project, and an indication that the current due date can be extended;
   identifying, by the resource management component, a current resource allocation for the ongoing project, wherein the current resource allocation specifies hardware and software resources currently assigned to the ongoing project, and employees currently working on the ongoing project;
   generating, by the resource management component, one or more features to be used as input to a machine learning (ML) model, based on the specified data sources and set of parameters;
   providing, by the resource management component, the generated features as input for a machine learning (ML) model to generate a modified resource allocation plan for the ongoing project, wherein the modified resource allocation plan specifies allocation of at least one allocate additional resources to the ongoing project, wherein the additional resources comprise (i) one or more of-additional hardware resources specified in the calendar of future availability of the one or more hardware resources, (ii) one or more additional software resources, and (iii) one or more additional employees for the ongoing project;
   determining, by the resource management component, a set of repercussions for the modified resource allocation, based at least in part on processing the modified resource allocation plan for the ongoing project using the ML model, wherein the set of repercussions comprise an indication that (i) the current due date will not be met, (ii) a cost of the ongoing project will remain below the budget, and (iii) a quality of the ongoing project will meet the required level of quality;

providing, by the resource management component, the modified resource allocation and the determined set of repercussions to the user;
responsive to receiving input accepting the modified resource allocation plan:
   allocating, by the resource management component, the one or more hardware resources and the one or more additional software resources to the ongoing project;
   modifying, by the resource management component, the current due date of the ongoing project; and
   notifying, by the resource management component, the one or more additional employees that they have been added to the ongoing project;
determining, by the resource management component, at a second point in time subsequent to the first point in time, a final completion status of the project, wherein the final completion status indicates (i) a date when the ongoing project was completed, and (ii) an amount that the ongoing project cost to be completed;
generating, by the resource management component, a set of refinement features based on the completion status; and
refining, by the resource management component, the ML model based on the generated refinement features, wherein refining the ML model comprises adjusting one or more weights included in the ML model.

2. The method of claim 1, wherein the at least one resource further comprises a human resource, wherein the set of parameters further comprise: (i) a modified due date for the project, (ii) a set of available hardware resources, (iii) a set of available software resources, (iv) a desired skill level of human resources added to develop the project, (iv) a source code repository, and (v) a desired number of recommended resource allocations for the resource allocation plan, wherein the generated resource allocation plan specifies the desired number of recommended resource allocations.

3. The method of claim 2, wherein the resource allocation plan further comprises at least one repercussion for at least one of the recommended resource allocation plans, wherein the hardware resources comprise: (i) one or more processors, (ii) a memory, (iii) a network bandwidth, and (iv) a storage, wherein the software resources comprise: (i) virtualized systems, and (ii) software test applications.

4. The method of claim 1, further comprising prior to generating the resource allocation plan:
   receiving data from the specified data sources, wherein the received data comprises: (i) audio data of recorded speech, and (ii) a plurality of electronic documents, wherein the plurality of documents are formatted according to a plurality of different formats;
   converting, by a transcription service, the audio data of the recorded speech to text; and
   converting, by a document conversion service, each of the plurality of documents to a standard format.

5. The method of claim 4, further comprising:
aggregating: (i) the received data from the specified data sources, (ii) the audio data converted to text, and (iii) the converted plurality of documents to create an aggregated data set; and
processing the aggregated data set based at least in part on a tradeoff service to identify: (i) the at least one resource to allocate to the project, and (ii) a plurality of recommendations for the resource allocation plan.

6. The method of claim 5, further comprising:
identifying, for each of the plurality of recommendations based on the ML model, a corresponding repercussion of implementing the plurality of recommendations.

7. The method of claim 6, further comprising:
ranking each of the plurality of recommendations and corresponding repercussion; and
generating the resource allocation plan based on the ranked plurality of recommendations and corresponding repercussions; and
storing the generated resource allocation plan.

8. A system, comprising:
one or more processors; and
a memory containing a program which when executed by the processors performs an operation comprising:
   identifying, by a resource management component executing by operation of one or more computer processors, a plurality of data sources;
   receiving, by the resource management component, from a user, at a first point in time, input specifying one or more of the plurality of data sources and a set of parameters;
   retrieving, by the resource management component, a code repository for an ongoing project, based on the input specifying one or more of the plurality of data sources;
   retrieving, by the resource management component, a calendar of future availability of one or more hardware resources, based on the input specifying one or more of the plurality of data sources;
   retrieving, by the resource management component, employee information, wherein the employee information includes an efficiency of each employee and a set of skills possessed by each employee, based on the input specifying one or more of the plurality of data sources;
   determining, by the resource management component, based on the input specifying the set of parameters, an ongoing project, a current due date for the ongoing project, a required level of quality for the ongoing project, a budget for the ongoing project, an indication that additional employees can be added to the project, and an indication that the current due date can be extended;
   identifying, by the resource management component, a current resource allocation for the ongoing project, wherein the current resource allocation specifies hardware and software resources currently assigned to the ongoing project, and employees currently working on the ongoing project;
   generating, by the resource management component, one or more features to be used as input to a machine learning (ML) model, based on the specified data sources and set of parameters;
   providing, by the resource management component, the generated features as input for a machine learning (ML) model to generate a modified resource allocation plan for the ongoing project, wherein the modified resource allocation plan specifies allocation of at least one allocate additional resources to the ongoing project, wherein the additional resources comprise (i) one or more of-additional hardware resources specified in the calendar of future availability of the one or more hardware resources, (ii) one or more additional software resources, and (iii) one or more additional employees for the ongoing project;

determining, by the resource management component, a set of repercussions for the modified resource allocation, based at least in part on processing the modified resource allocation plan for the ongoing project using the ML model, wherein the set of repercussions comprise an indication that (i) the current due date will not be met, (ii) a cost of the ongoing project will remain below the budget, and (iii) a quality of the ongoing project will meet the required level of quality;

providing, by the resource management component, the modified resource allocation and the determined set of repercussions to the user;

responsive to receiving input accepting the modified resource allocation plan:
allocating, by the resource management component, the one or more hardware resources and the one or more additional software resources to the ongoing project;
modifying, by the resource management component, the current due date of the ongoing project; and
notifying, by the resource management component, the one or more additional employees that they have been added to the ongoing project;

determining, by the resource management component, at a second point in time subsequent to the first point in time, a final completion status of the project, wherein the final completion status indicates (i) a date when the ongoing project was completed, and (ii) an amount that the ongoing project cost to be completed;

generating, by the resource management component, a set of refinement features based on the completion status; and refining, by the resource management component, the ML model based on the generated refinement features, wherein refining the ML model comprises adjusting one or more weights included in the ML model.

9. The system of claim 8, wherein the at least one resource further comprises a human resource, wherein the set of parameters further comprise: (i) a modified due date for the project, (ii) a set of available hardware resources, (iii) a set of available software resources, (iv) a desired skill level of human resources added to develop the project, (iv) a source code repository, and (v) a desired number of recommended resource allocations for the resource allocation plan, wherein the generated resource allocation plan specifies the desired number of recommended resource allocations.

10. The system of claim 9, wherein the resource allocation plan further comprises at least one repercussion for at least one of the recommended resource allocation plans, wherein the hardware resources comprise: (i) one or more processors, (ii) a memory, (iii) a network bandwidth, and (iv) a storage, wherein the software resources comprise: (i) virtualized systems, and (ii) software test applications.

11. The system of claim 8, the operation further comprising prior to generating the resource allocation plan:
receiving data from the specified data sources, wherein the received data comprises: (i) audio data of recorded speech, and (ii) a plurality of electronic documents, wherein the plurality of documents are formatted according to a plurality of different formats;
converting, by a transcription service, the audio data of the recorded speech to text; and
converting, by a document conversion service, each of the plurality of documents to a standard format.

12. The system of claim 11, the operation further comprising:
aggregating: (i) the received data from the specified data sources, (ii) the audio data converted to text, and (iii) the converted plurality of documents to create an aggregated data set; and
processing the aggregated data set based at least in part on a tradeoff service to identify: (i) the at least one resource to allocate to the project, and (ii) a plurality of recommendations for the resource allocation plan.

13. The system of claim 12, the operation further comprising:
identifying, for each of the plurality of recommendations based on the ML model, a corresponding repercussion of implementing the plurality of recommendations.

14. The system of claim 13, the operation further comprising:
ranking each of the plurality of recommendations and corresponding repercussion; and
generating the resource allocation plan based on the ranked plurality of recommendations and corresponding repercussions; and
storing the generated resource allocation plan.

15. A computer program product, comprising:
a non-transitory computer-readable storage medium having computer-readable program code embodied therewith, the computer-readable program code executable by one or more computer processors to perform an operation comprising:
identifying, by a resource management component executing by operation of one or more computer processors, a plurality of data sources;
receiving, by the resource management component, from a user, at a first point in time, input specifying one or more of the plurality of data sources and a set of parameters;
retrieving, by the resource management component, a code repository for an ongoing project, based on the input specifying one or more of the plurality of data sources;
retrieving, by the resource management component, a calendar of future availability of one or more hardware resources, based on the input specifying one or more of the plurality of data sources;
retrieving, by the resource management component, employee information, wherein the employee information includes an efficiency of each employee and a set of skills possessed by each employee, based on the input specifying one or more of the plurality of data sources;
determining, by the resource management component, based on the input specifying the set of parameters, an ongoing project, a current due date for the ongoing project, a required level of quality for the ongoing project, a budget for the ongoing project, an indication that additional employees can be added to the project, and an indication that the current due date can be extended;
identifying, by the resource management component, a current resource allocation for the ongoing project, wherein the current resource allocation specifies hardware and software resources currently assigned to the ongoing project, and employees currently working on the ongoing project;
generating, by the resource management component, one or more features to be used as input to a machine learning (ML) model, based on the specified data sources and set of parameters;

providing, by the resource management component, the generated features as input for a machine learning (ML) model to generate a modified resource allocation plan for the ongoing project, wherein the modified resource allocation plan specifies allocation of at least one allocate additional resources to the ongoing project, wherein the additional resources comprise (i) one or more of-additional hardware resources specified in the calendar of future availability of the one or more hardware resources, (ii) one or more additional software resources, and (iii) one or more additional employees for the ongoing project;

determining, by the resource management component, a set of repercussions for the modified resource allocation, based at least in part on processing the modified resource allocation plan for the ongoing project using the ML model, wherein the set of repercussions comprise an indication that (i) the current due date will not be met, (ii) a cost of the ongoing project will remain below the budget, and (iii) a quality of the ongoing project will meet the required level of quality;

providing, by the resource management component, the modified resource allocation and the determined set of repercussions to the user;

responsive to receiving input accepting the modified resource allocation plan:

allocating, by the resource management component, the one or more hardware resources and the one or more additional software resources to the ongoing project;

modifying, by the resource management component, the current due date of the ongoing project; and notifying, by the resource management component, the one or more additional employees that they have been added to the ongoing project;

determining, by the resource management component, at a second point in time subsequent to the first point in time, a final completion status of the project, wherein the final completion status indicates (i) a date when the ongoing project was completed, and (ii) an amount that the ongoing project cost to be completed;

generating, by the resource management component, a set of refinement features based on the completion status; and refining, by the resource management component, the ML model based on the generated refinement features, wherein refining the ML model comprises adjusting one or more weights included in the ML model.

16. The computer program product of claim 15, wherein the at least one resource further comprises a human resource, wherein the set of parameters further comprise: (i) a modified due date for the project, (ii) a set of available hardware resources, (iii) a set of available software resources, (iv) a desired skill level of human resources added to develop the project, (iv) a source code repository, and (v) a desired number of recommended resource allocations for the resource allocation plan, wherein the generated resource allocation plan specifies the desired number of recommended resource allocations.

17. The computer program product of claim 16, wherein the resource allocation plan further comprises at least one repercussion for at least one of the recommended resource allocation plans, wherein the hardware resources comprise: (i) one or more processors, (ii) a memory, (iii) a network bandwidth, and (iv) a storage, wherein the software resources comprise: (i) virtualized systems, and (ii) software test applications.

18. The computer program product of claim 15, the operation further comprising prior to generating the resource allocation plan:

receiving data from the specified data sources, wherein the received data comprises: (i) audio data of recorded speech, and (ii) a plurality of electronic documents, wherein the plurality of documents are formatted according to a plurality of different formats;

converting, by a transcription service, the audio data of the recorded speech to text; and converting, by a document conversion service, each of the plurality of documents to a standard format.

19. The computer program product of claim 18, the operation further comprising:

aggregating: (i) the received data from the specified data sources, (ii) the audio data converted to text, and (iii) the converted plurality of documents to create an aggregated data set; and processing the aggregated data set based at least in part on a tradeoff service to identify: (i) the at least one resource to allocate to the project, and (ii) a plurality of recommendations for the resource allocation plan.

20. The computer program product of claim 19, the operation further comprising:

identifying, for each of the plurality of recommendations based on the ML model, a corresponding repercussion of implementing the plurality of recommendations;

ranking each of the plurality of recommendations and corresponding repercussion; and generating the resource allocation plan based on the ranked plurality of recommendations and corresponding repercussions; and storing the generated resource allocation plan.

* * * * *